Aug. 20, 1957 W. P. POWERS 2,803,457
SLIDE FEED WITH SPRING CLOSED GRIPPER
Filed Oct. 18, 1955 6 Sheets-Sheet 1

INVENTOR.
WALTER P. POWERS
BY
ATTORNEY

Aug. 20, 1957    W. P. POWERS    2,803,457
SLIDE FEED WITH SPRING CLOSED GRIPPER
Filed Oct. 18, 1955    6 Sheets-Sheet 2
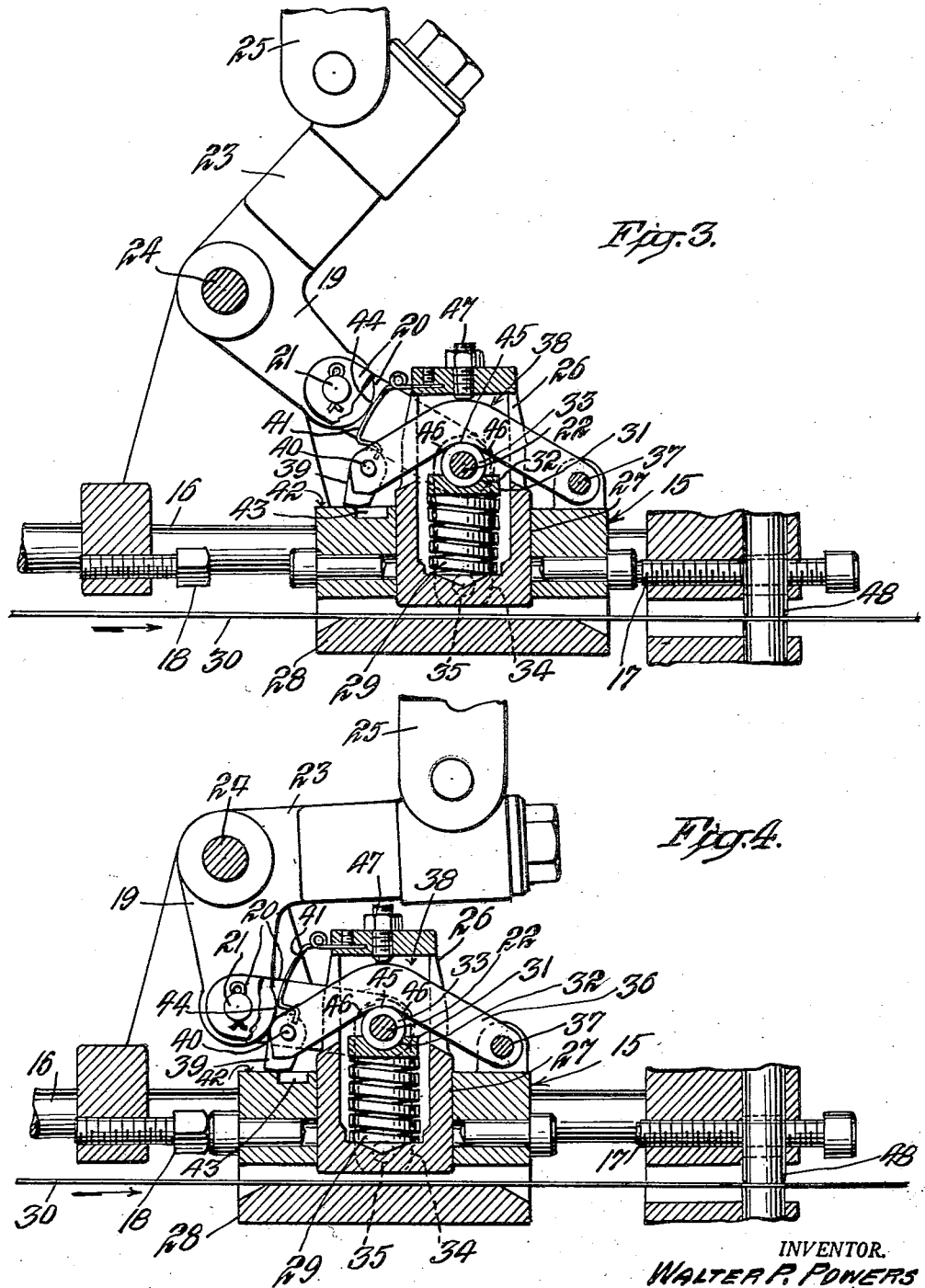
INVENTOR.
WALTER P. POWERS
BY
ATTORNEY

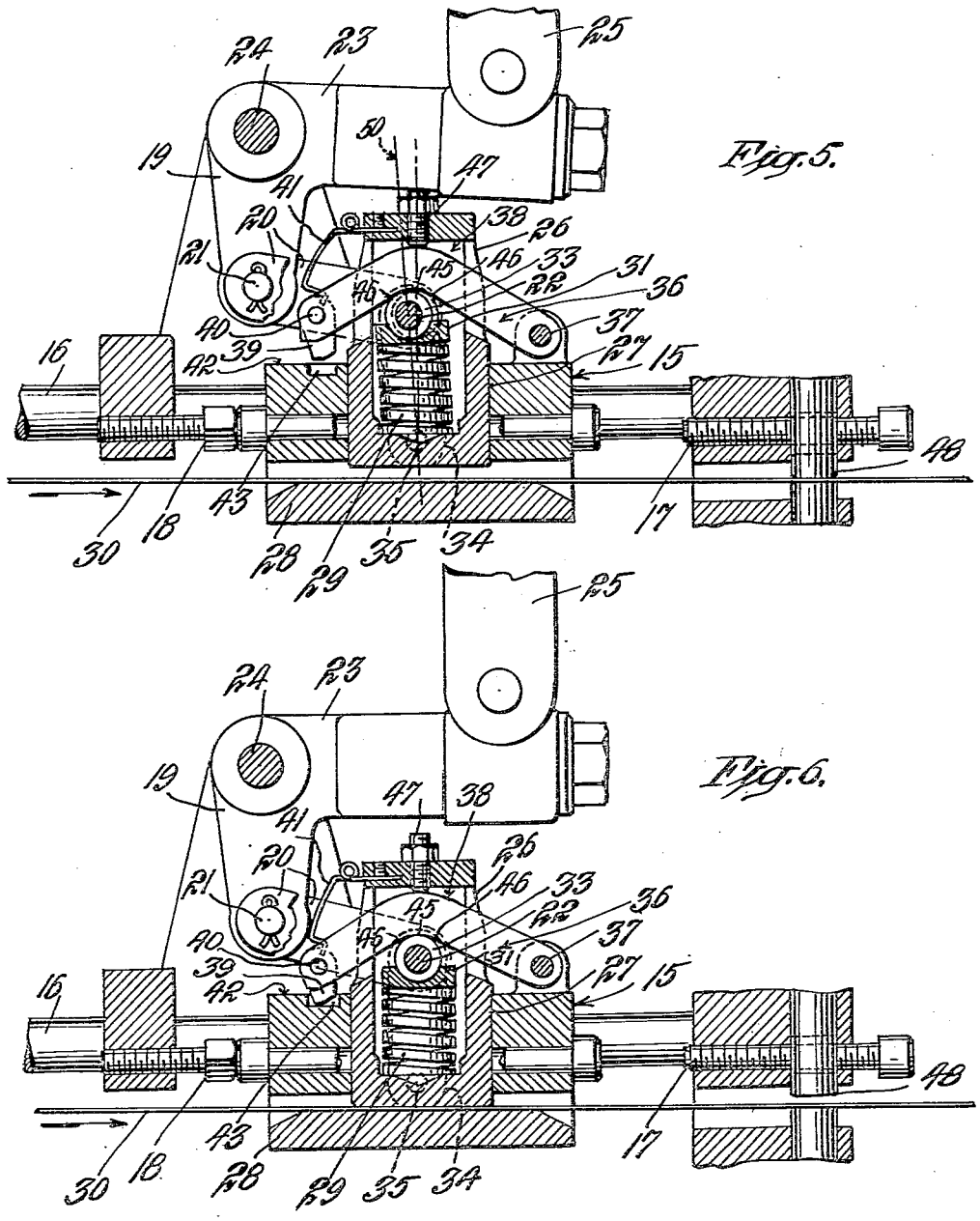

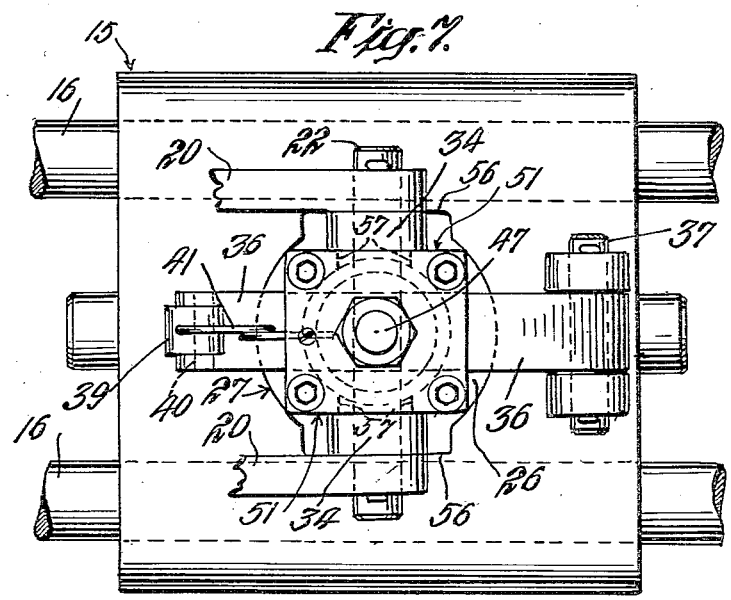
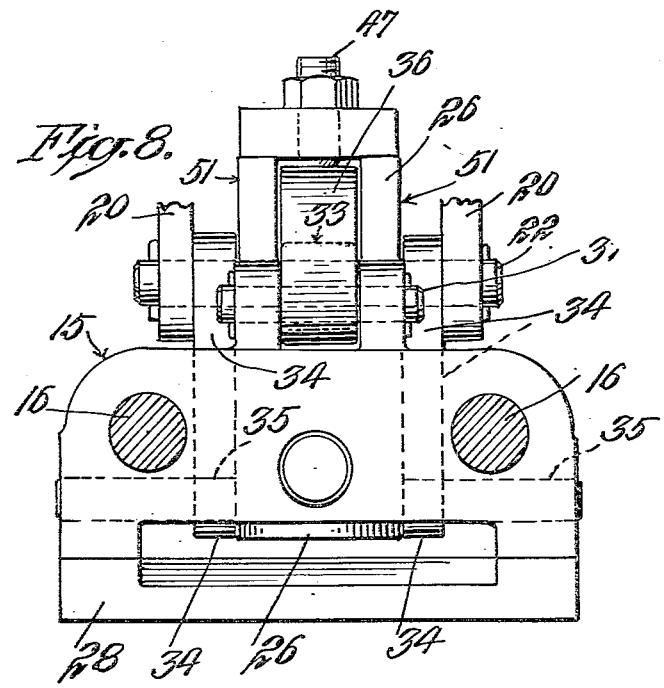

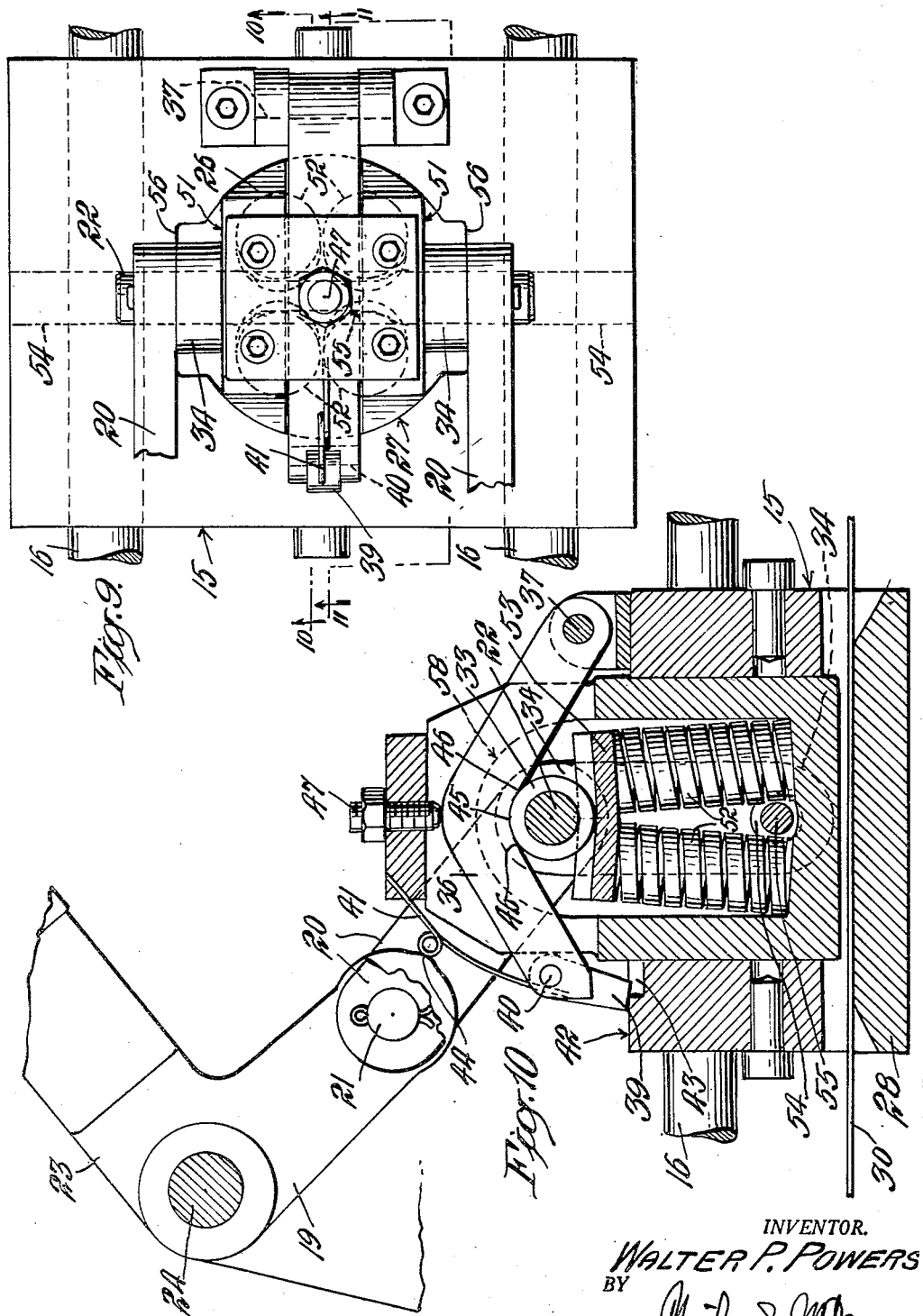

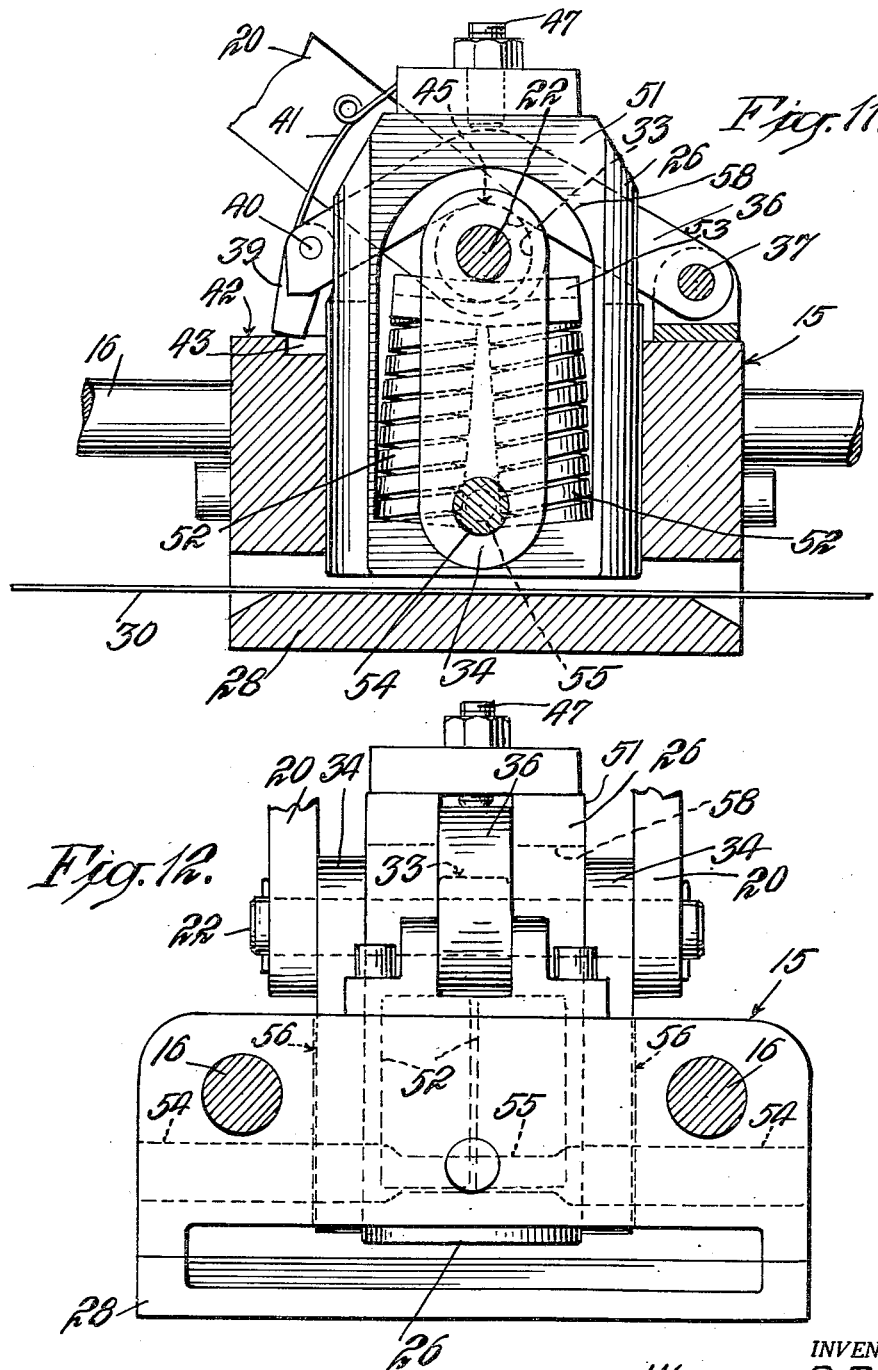

United States Patent Office 2,803,457
Patented Aug. 20, 1957

2,803,457

SLIDE FEED WITH SPRING CLOSED GRIPPER

Walter P. Powers, Spring Lake, N. J., assignor to C. Todd, Rutherford, N. J., as trustee Application October 18, 1955, Serial No. 541,253

8 Claims. (Cl. 271—2.5)

The invention herein disclosed relates to slide feeds and general objects of the invention are to provide a simplified form of gripper for the stock which will consist of but few parts and which will operate with certainty to firmly grip and accurately feed the stock.

Further special objects of the invention are to provide the gripper mechanism in condensed, compact form, taking up small space and enabling use where operating space may be limited.

Other important objects of the invention are to incorporate in the mechanism certain yielding effects automatically coming into operation at the ends of the feed and recovery strokes for cushioning the action and enabling proper correlated timing of the speed gripper and stock check.

Other desirable objects and the novel features of construction, combination and relation of parts through which the purposes of the invention are attained are set forth and will appear in the course of the following specification.

The drawings accompanying and forming part of the specification illustrate present practical embodiments of the invention but structure may be modified and changed as regards the immediate illustration, all within the true intent and scope of the invention as hereinafter defined and claimed.

Fig. 1 in the drawings is a broken part sectional front elevation of the slide feed showing the slide block advanced by the toggle into engagement with the front stop, the toggle having reached substantially straightened condition but not having passed over dead-center. In this view the spring closed gripper plunger is still engaged with the stock and the stock check is open.

Fig. 3 is a like view showing the toggle started back over dead-center and with the projected latch lowered into engagement with the top of the block and holding the cam lever up with gripper in open position. The check is at this time closed on the stock.

Fig. 4 is a similar view showing the block at the end of the recovery stroke in engagement with the back stop, with the gripper still open and the check closed on the stock.

Fig. 5 is a similar view showing how with slight further retractive movement of the toggle the cam lever will be lifted to take the load off the latch and the latter will be snapped by the latch spring into position over the recess in the top of the block.

Fig. 6 is a similar view showing the toggle started in its forward movement, lowering the cam lever and closing the gripper at beginning of the feed stroke, with check open.

Figs. 7 and 8 are top plan and front elevation views of the gripper assembly.

Fig. 9 is a top plan view of a modified form of the invention utilizing four gripper closing springs in place of the single gripper closing spring first illustrated.

Fig. 10 is a vertical sectional view of this latter form of the invention, on substantially the plane of line 10—10 of Fig. 9.

Fig. 11 is a vertical section and Fig. 12 is a front view of the four-spring gripper construction, the sectional view taken substantially on line 11—11 of Fig. 9.

Figure 1:
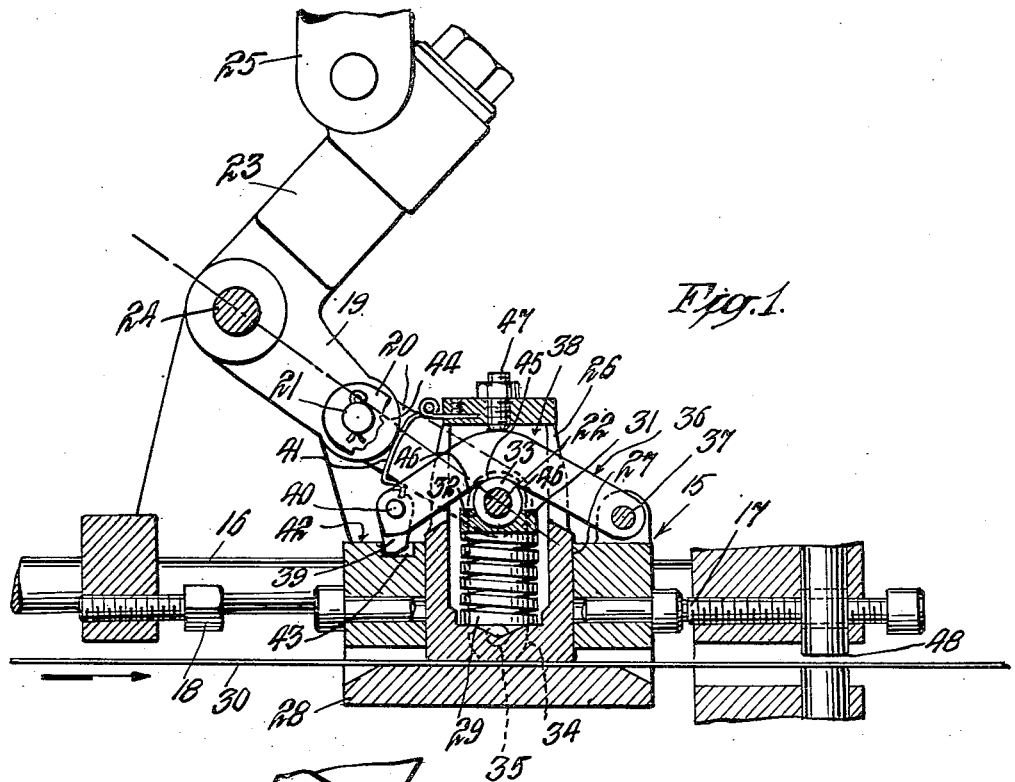

The invention comprises a gripper carrying block 15 mounted to slide on guide rods 16 between the front and back stops 17 and 18 and actuated by an oscillating toggle made up of upper and lower levers 19 and 20 pivotally connected together at their meeting ends at 21 and carrying at the free end of the toggle a cross-pin 22 pivotally linked to the block.

The upper or live toggle lever 19 in the illustration is the lower arm of a bell crank 23 mounted to rock on a supporting shaft 24 and connected usually by a link 25 with an operating crank or eccentric on the press or other machine with which the slide feed is used.

The gripper consists of a hollow plunger 26 mounted to operate in a vertical guideway 27 in the top of the block in cooperative relation to the anvil or bottom plate 28 of the block.

In the first form of the invention illustrated in Figs. 1 to 8, a single, fairly heavy spring 29 is employed for closing the gripper plunger against the stock 30. This spring is shown interposed between the lower, closed end of the hollow gripper plunger and a saddle piece 31 having a part circular cavity 32 bearing against a roller 33 on the toggle pin 22.

The ends of toggle pin 22 are shown as pivotally shackled to the block by links 34 which are pivoted to the block at the bottom by pins 35. Thus the spring is made effective to close the gripper plunger down on the stock extending through the block and the block is yieldingly connected with the toggle.

Opening and closing movement of the gripper is governed by an arched lift lever 36 pivotally mounted at one end on the top of the block at 37 and extending freely through an opening 38 in the plunger, over the top of roller 33 and carrying at the opposite end a latch or prop 39 pivoted on this end of the lever at 40.

The latch or trigger 39 for supporting or releasing the gripper lever 36 is positioned by spring 41 either to engage the top supporting surface 42 or to enter a recess 43 in the top of the block.

Figure 2:
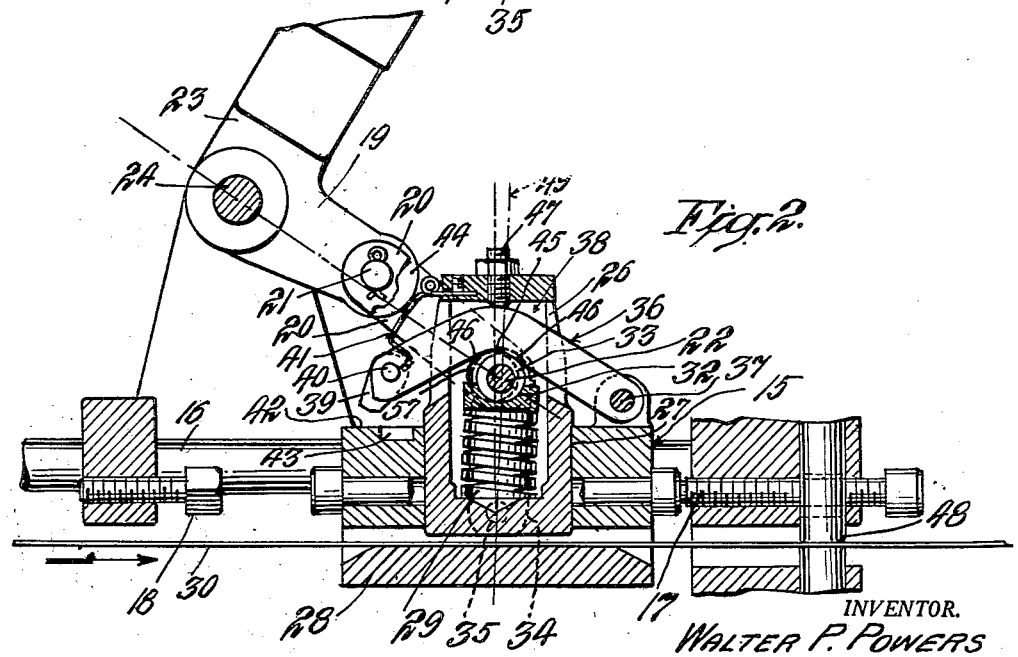
Fig. 2 is a similar view showing the toggle straightened slightly past dead-center with the roll on the forward toggle pin lifting the arched cam lever to open the gripper and the cam on the end of the first toggle lever pressing on the latch spring to throw that out into the lever supporting position and with the stock check closed.

Operation of the trigger spring 41 is effected in the illustration by a cam 44 on the end of the upper toggle lever 19 positioned and arranged to engage the spring in the approximate straightened condition of the toggle shown in Figs. 2 and 3.

The lower edge of the gripper opening lever 36 is shown as rounded at 45 to receive the roll 33 and thus exercise a centering effect on the spring pile and as having downward inclines 46 at opposite ends of the curve serving as cams under engagement by the roll.

A stop screw 47 in the top of the plunger provides the lifting connection between lever 36 and plunger, and up and down adjustment of the plunger for different thickness of stock may be effected by means of this screw.

*Operation*

Fig. 1 shows parts as they appear at the end of the forward feed stroke with the toggle links or levers 19, 20 approaching fully straightened condition and the slide block up against the front stop, the gripper plunger in the lower, closed position and the stock check, indicated at 48, open.

Fig. 2 shows the toggle advanced slightly over dead-center. In this slight additional movement the toggle pin 22 will be rocked forwardly causing roll 33, by engagement with the forward cam surface 46, to lift the lever sufficiently to raise the latch 39 out of recess 43. At this time also cam 44 on the lower end of the toggle lever 19 will depress spring 41 sufficiently to rock the latch 39 out over the supporting surface 42 on the top of the block.

In this slight additional movement of the toggle over or in the region of dead-center with the block up against the front stop, the hold-down links 34 will permit the spring pile to rock forwardly, as indicated by the broken line 49.

The gripper closing spring 29 is thus utilized as a controlling force permitting the slight additional necessary movement to lift gripper lever 36 and set the latch in position for supporting the lever in the gripper open condition. This spring also is a yielding force holding the block up against the front stop at the start of the return or recovery movement of the toggle.

In the reverse movement of the toggle in the dead-center region the block remains at rest against the front stop while the spring pile is straightening up and lowering the lever 36 sufficiently for the outwardly swung latch 39 to engage supporting surface 42, as indicated in Fig. 3.

Fig. 4 shows the block at the end of the recovery stroke in engagement with back stop 18 and with gripper supported by latch 39 in open relation and check still closed.

Fig. 5 illustrates slightly further retractive movement of the toggle sufficient to rock the spring pile backward to the position indicated by line 50, thus causing roll 33 to lift lever 36, taking the load off the supporting latch 39 and enabling spring 41 to rock the latch inward into position over recess 43.

Then upon commencement of forward feeding stroke of the toggle while absorbing pressure of the spring in its inclined relation holding the block up against the back stop, the plunger will lower to grip the stock before the block will leave the back stop. Prior to or at the moment of closing the gripper the check will open, as indicated.

Fig. 6 shows the parts at the instant of starting the feed stroke, with the gripper closing spring centered in upright position holding the plunger in gripping engagement with the stock and the stock check open.

Details of the check actuating mechanism are not shown in full. The interconnection between gripper actuating mechanism and stock check may be the same or similar to that disclosed in co-pending patent applications, Serial No. 442,699, filed July 12, 1954, Patent No. 2,721,649, October 25, 1955, Serial No. 506,141, filed May 5, 1955 and Serial No. 541,221, filed October 18, 1955.

The extended area of the gripper plunger provides sufficient hold for handling most strip materials. The plunger may be completely circular or have flattened sides as shown at 51, the latter construction desirable as enabling the links 34 to be located close to the sides of the plunger, Fig. 8, between the guide rods 16. The plunger may be of other cross-sectional shape such as oval or angular and the companion faces of plunger and anvil may be shaped to accommodate curved or angular cross-sectioned strip material.

If wider or heavier stock is to be handled more than one closing spring may be employed, as illustrated in Figs. 9 to 12, where the parts are enlarged to accommodate four gripper closing springs 52 seated in the hollow gripper plunger in convergently inclined relation, bearing on an extended saddle piece 53 engaging the cam roller 33. The action in this heavier form of slide feed may be the same as described above.

In all constructions the parts are few and of rugged design, compactly arranged and occupying small space. The complete unit may be reasonably light in weight so as to avoid undue inertia and hammer effects. These factors, with the cushioning accomplished by the inclining of the hold-down spring or springs at opposite ends of the stroke promote smooth, quiet operation and avoid the need for brakes on the slide block.

The upper or live toggle lever 19 is shown as a single rocker arm and the lower lever 20 as a pair of parallel links at the opposite sides of the rocker arm, with the cross-pin 22 joining these links at the free end of the toggle. This arrangement, with the spring confining swinging links 34 disposed in parallel relation at the inner sides of the toggle links, forms a compact unit in which the parts brace and maintain each other in proper alignment. The spring confining links lie close to opposite sides of the plunger in alignment or parallel with the longitudinal axis of the plunger, in the upright position, Fig. 1, free to swing in the over-travel movement of the toggle, Figs. 2 and 5, as the spring leans forwardly or backwardly for camming up the gripper opening lever 36.

The pivots holding the spring confining links to the block may be two separate pins such as shown at 35 in Fig. 8 or, as shown in Fig. 12, these may be provided by a single pin 54 extending all the way through the block and having a reduced portion 55, Fig. 10, where it extends through the hollow plunger, to avoid the springs.

To fully guide and maintain the links in parallelism the block may be finished with upright guide walls 56 for the outer sides of the swinging links.

To freely accommodate the cross-pin 22 and allow for both the swinging movements and the up and down adjustments, the plunger may have an oversize opening 57 through the sides of the same, Figs. 2 and 7, or be made with fully open sides such as shown at 58 in Fig. 11.

While at present preferred to put the gripper hold-open latch on the lift lever 36, it is contemplated that this latch may be mounted on the block in position to cooperate with the free end of the lever and be shifted into lever supporting and release positions by means such as a spring and toggle cam first illustrated.

The spring or springs for closing the gripper may be short, stiff and large diameter, tensioned to stand up straight in the free sliding movement of the block and ready to lean one way or the other at opposite ends of the block travel. This assures firm, positive grip of the stock. The extended area afforded by the face of the gripper plunger avoids injury to stock even under heavy pressure and the ability of the spring pile to lean over at the ends of the movement provides a built-in cushioning action available the instant required.

What is claimed is:

1. Slide feed comprising the combination of reciprocating slide block, a stock gripping plunger operable in said block, spring means for holding said plunger in stock gripping relation, a lever in engagement with said plunger in opposition to said spring means for releasing said plunger from gripping engagement with the stock, an oscillating toggle for reciprocating the block and actuating said releasing lever, a cross-pin carried by said toggle, link means pivotally connecting said cross-pin with said block, said spring means being interposed between said cross-pin and plunger, and said cross-pin having an actuating connection with said releasing lever for lifting said lever in opposition to the power of said spring and said toggle having oscillating movement sufficient for reciprocating said block and then effecting plunger releasing movement of said releasing lever.

2. The invention according to claim 1, with latch mechanism for restraining the lever mentioned, in the releasing position and means on said oscillating toggle for actuating said latch in opposite directions at opposite ends of the reciprocating block movement and whereby said toggle is effective for reciprocating the block, actuating said releasing lever and operating said latch mechanism in correlated timed relation.

3. Slide feed comprising the combination of reciprocating slide block, a stock gripping plunger operable in said block, spring means for holding said plunger in stock gripping relation, a lever for releasing said plunger from gripping engagement with the stock, an oscillating toggle for reciprocating the block and actuating said releasing lever, a cross-pin carried by said toggle, link means pivotally connecting said cross-pin with said block, said spring means being interposed between said cross-pin and plunger, and said cross-pin having an actuating connection with said releasing lever, including a roller on the cross-pin and the lever having a part circular cavity receiving said roller and divergent cam inclines at opposite ends of said circular cavity.

4. Slide feed comprising the combination of reciprocating slide block, a stock gripping plunger operable in said block, spring means for holding said plunger in stock gripping relation, a lever for releasing said plunger from gripping engagement with the stock, an oscillating toggle for reciprocating the block and actuating said releasing lever, a cross-pin carried by said toggle, link means pivotally connecting said cross-pin with said block, said spring means being interposed between said cross-pin and plunger, and said cross-pin having an actuating connection with said releasing lever, said oscillating toggle having a movement carrying the same to substantially straightened condition, a latch for restraining the releasing lever and cam means on the toggle for effecting actuation of said latch in the movement of the toggle in approximating the straightened condition of the same.

5. The invention according to claim 1, in which said link means includes parallel links at opposite sides of the plunger with the cross-pin connecting said parallel links and the spring means disposed within the plunger between said parallel links.

6. Slide feed comprising the combination of reciprocating slide block, a hollow stock gripping plunger guided in said block, an oscillating toggle having a cross-pin at the free end of the same extending freely through said hollow plunger, gripper closing spring means in said hollow plunger and bearing against said cross-pin, swinging links at opposite sides of the plunger pivotally connected with said cross-pin at one end and pivotally connected with the block at the opposite end, a gripper opening lever pivoted on the block and extending freely through the plunger over said cross-pin, said lever having a lifting connection with the plunger and provided at the free end of the same with a latch engageable with the block in one position for supporting the lever and disengageable in another position for releasing the lever, a spring for shifting said latch into one position and cam means on the toggle for effecting movement of the latch to the other position.

7. Slide feed comprising the combination of reciprocating slide block, a stock gripping plunger on said block, an oscillating toggle, a pin at the end of said toggle, a link pivotally connecting said pin with said block, a compression spring interposed between said pin and plunger for thrusting said plunger in the stock gripping direction, a lever pivoted on the block and in engagement with the plunger for lifting said plunger in opposition to said spring, said lever having cam engagement with said pin whereby on rocking movement of the pin relative to said block said lever will be raised to lift the plunger, said spring being tensioned to hold said link upright on the block in normal free sliding movement of the slide block and to yield on stoppage of the block at opposite ends of its travel, stops limiting motion of the block in opposite directions and said toggle having oscillating movement sufficient to carry the block into engagement with said stops and over-travel sufficient to effect swinging movement of said link out of the upright position for effecting lifting stock grip releasing movement of said plunger.

8. Slide feed comprising the combination of reciprocating slide block, a stock gripping plunger operable in said block, links pivoted to the block at opposite sides of said plunger, a cross-pin connecting said links, spring means interposed between said cross-pin and plunger for holding the plunger in stock gripping relation, an oscillating toggle connected with said cross-pin for reciprocating the block, said spring means tensioned to hold the links upright in normal free sliding movement of the block and to yield on stopapge of the block at opposite ends of its travel to permit said links to swing out of the upright position and means actuated by travel of said cross-pin in said swinging movement of the links for lifting the plunger in opposition to the force exerted by said spring means.

References Cited in the file of this patent

UNITED STATES PATENTS

| 562,222 | Granger | June 16, 1896 |

FOREIGN PATENTS

| 25,009 | Great Britain | Nov. 3, 1913 |
| 178,649 | Great Britain | Apr. 27, 1922 |